(12) United States Patent
Watanabe

(10) Patent No.: US 11,520,353 B2
(45) Date of Patent: Dec. 6, 2022

(54) STATION AND IN-VEHICLE DEVICE

(71) Applicant: DENSO CORPORATION, Kariya (JP)

(72) Inventor: Fumio Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 16/752,762

(22) Filed: Jan. 27, 2020

(65) Prior Publication Data

US 2020/0249696 A1   Aug. 6, 2020

(30) Foreign Application Priority Data

Feb. 5, 2019 (JP) .............................. JP2019-018858

(51) Int. Cl.
*G05D 1/02* (2020.01)
*H04W 4/46* (2018.01)
*G05D 1/00* (2006.01)

(52) U.S. Cl.
CPC ......... *G05D 1/0289* (2013.01); *G05D 1/0027* (2013.01); *G05D 1/0214* (2013.01); *G05D 1/0291* (2013.01); *H04W 4/46* (2018.02); *G05D 2201/0213* (2013.01)

(58) Field of Classification Search
CPC .. G05D 1/0289; G05D 1/0027; G05D 1/0214; G05D 1/0291; G05D 2201/0213; H04W 4/46; H04W 4/027; H04W 4/029; H04W 4/44; G01C 21/165; G01C 21/28; G08G 1/137; H04L 67/12
See application file for complete search history.

(56) References Cited

FOREIGN PATENT DOCUMENTS

| EP | 2037219 A1 * | 3/2009 | ......... G01C 21/3461 |
|----|---|---|---|
| JP | H8016986 A | 1/1996 | |
| JP | 2004-245610 A | 9/2004 | |
| JP | 2004245610 A * | 9/2004 | |
| JP | 2007263886 A * | 10/2007 | |
| JP | 2008217079 A | 9/2008 | |
| JP | 2016143137 A | 8/2016 | |
| WO | WO-2018109938 A1 * | 6/2018 | ............. G01C 21/26 |

* cited by examiner

*Primary Examiner* — Rodney A Butler

(74) *Attorney, Agent, or Firm* — Harness, Dickey & Pierce, P.L.C.

(57) ABSTRACT

A server station receives situation information and vehicle information respectively from three vehicles. The server station calculates how to pass by an on-coming vehicle for each of the three vehicles, and sends to each of the three vehicles a wait instruction of where to wait for and pass by the on-coming vehicle or a notification instruction of the on-coming vehicle when there is no place to wait. For example, the server station sends, to a first vehicle, the notification instruction due to having no place to wait, sends, to a second vehicle, a wait instruction to wait at a current position, which is a pass-by place, until the on-coming vehicle passes, and sends, to a third vehicle, a wait instruction to wait in a pass-by place, which is available to the third vehicle.

11 Claims, 6 Drawing Sheets

STATION AND IN-VEHICLE DEVICE

CROSS REFERENCE TO RELATED APPLICATION

The present application is based on and claims the benefit of priority of Japanese Patent Application No. 2019-018858, filed on Feb. 5, 2019, the disclosure of which is incorporated herein by reference.

TECHNICAL FIELD

The present disclosure generally relates to a station and an in-vehicle device.

BACKGROUND INFORMATION

In the related art, a technique for allowing vehicles to pass by in a narrow section of a road is disclosed, regarding which relevant vehicles share position information and the like by vehicle-to-vehicle communication, an on-coming vehicle is detected with which a subject vehicle is expected to encounter in a hard-to-pass-by road section based on the position information and the like, and the subject vehicle is supported by receiving notification of an optimal pass-by place or point based on a predictive calculation of such place or point.

However, as a result of detailed investigations by an applicant of the present disclosure, in the technique disclosed in the related art, when there are other vehicle(s) other than the subject vehicle and the on-coming vehicle, the notified pass-by place may be not available to the subject vehicle, due to the pre-occupation of the pass-by place by the other vehicle(s).

SUMMARY

It is an object of the present disclosure to provide a technique capable of notifying a driver of a subject vehicle about a pass-by place available to the subject vehicle in consideration of other vehicle(s) other than an on-coming vehicle.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereinafter; exemplary embodiments of the present disclosure are described with reference to the drawings.

[1. Overview] A drive support system 1 takes into consideration the presence of other, nearby vehicles other than an on-coming vehicle, for giving an instruction to a driver of each of the relevant vehicles in terms of how those vehicles safely pass each other in a hard-to-pass-by road section.

Figure 1:
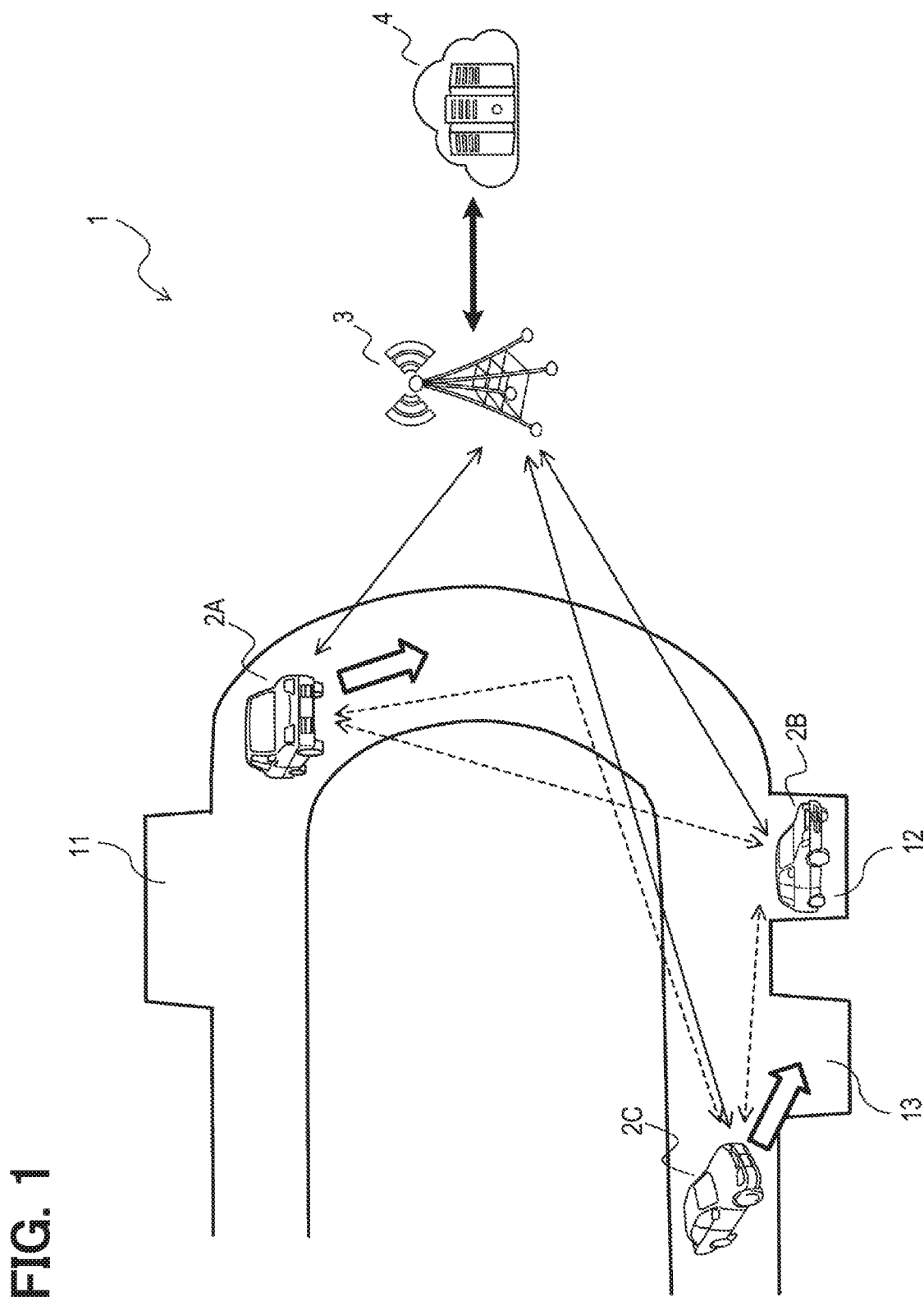
FIG. 1 is a schematic view of a drive support system.

An illustration shown in FIG. 1 is, for example, a one-lane mountain road, and may more specifically be a hard-to-pass-by road section, such as blind-curved road section or the like. In the hard exist, which are places where it is possible to pass by an on-coming vehicle. As shown in FIG. 1, vehicles 2A and 2C are traveling in the hard-to-pass-by road section, and the vehicle 2B is waiting in a pass-by place 12. The vehicles 2A, 2B, and 2C are located in a communication area of a station 3, which is a coverage area of wireless communication as indicated by thin solid line arrows, and the vehicles 2A; 2B; and 20 are also within a vehicle-to-vehicle communication distance from each other.

Figure 2:
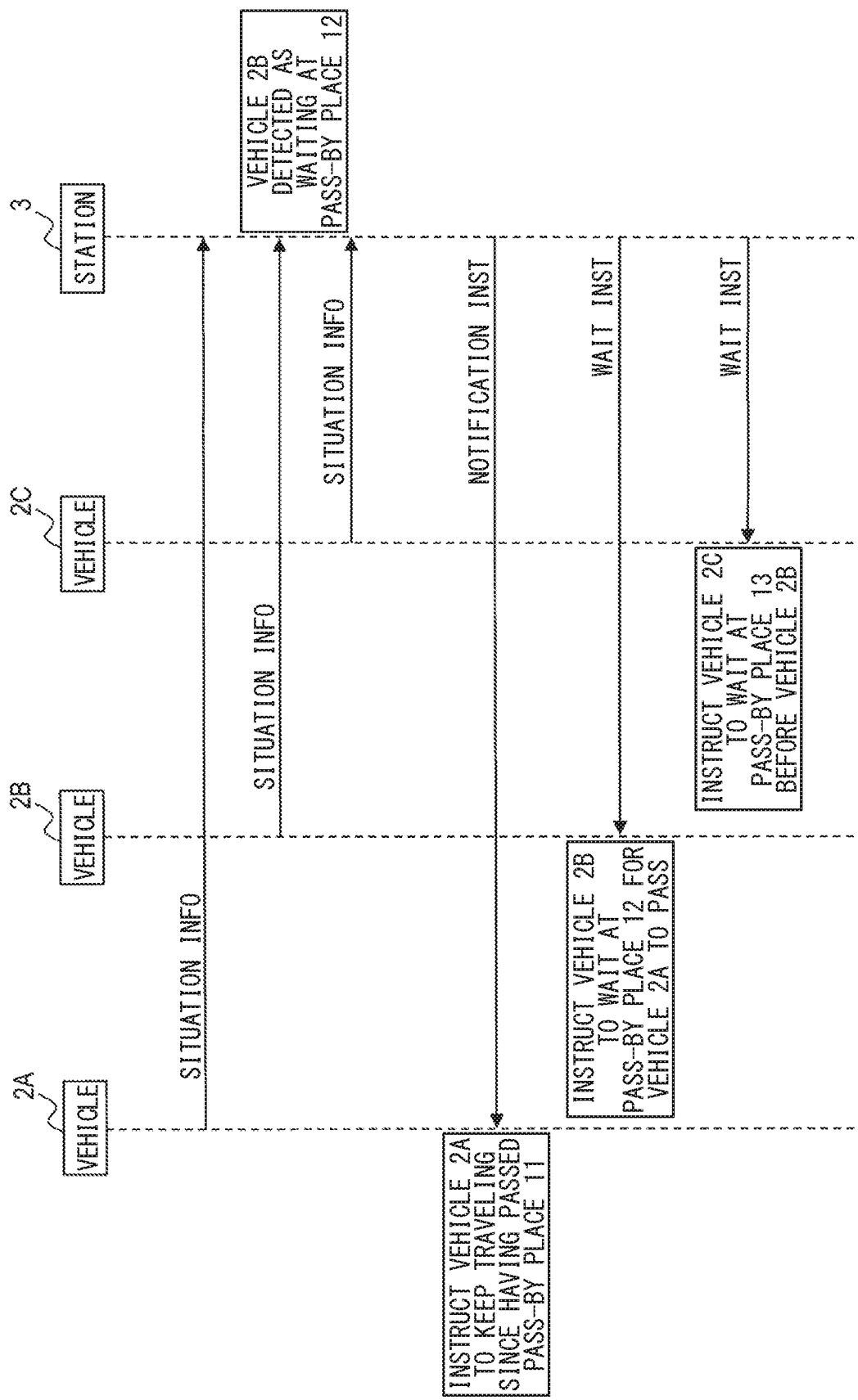
FIG. 2 is a timing chart of the drive support system of a first embodiment in the present disclosure.

As shown in FIG. 2, each of the vehicle 2A; the vehicle 2B; and the vehicle 20 transmits, to the station 3, (a) situation information which is information indicating a travel situation of the vehicle such as a current position, a travel speed and a travel direction and (b) vehicle information which is information indicating a size of the vehicle such as a vehicle width and a vehicle length.

The station 3 calculates how each of the vehicle 2A to 2C should pass by the on-coming vehicle based on the situation information and the vehicle information received respectively from the vehicles 2A to 2C, and transmits, to each vehicle, either a wait instruction for instructing at which one of pass-by places (e.g., 11, 12, or 13) to wait or a notification instruction for instructing to notify the presence of an on-coming vehicle when there is no pass-by place available to a relevant vehicle. The vehicles 2A to 2C having received the wait instruction or the notification instruction perform a notification to the driver based on the received instruction. As a result, in an example of FIG. 1, the movements of the vehicles 2A to 20 based on the instruction are as follows.

Since the vehicle 2A has already passed the pass-by place 11, the vehicle 2A continues traveling as it currently does. Since a current location of the vehicle 2B is the pass-by place 12, the vehicle 2B waits at the current location until the on-coming vehicle 2A passes. The vehicle 2C waits at the pass-by place 13 before the pass-by place 12 where the vehicle 2B is waiting.

Figure 3:
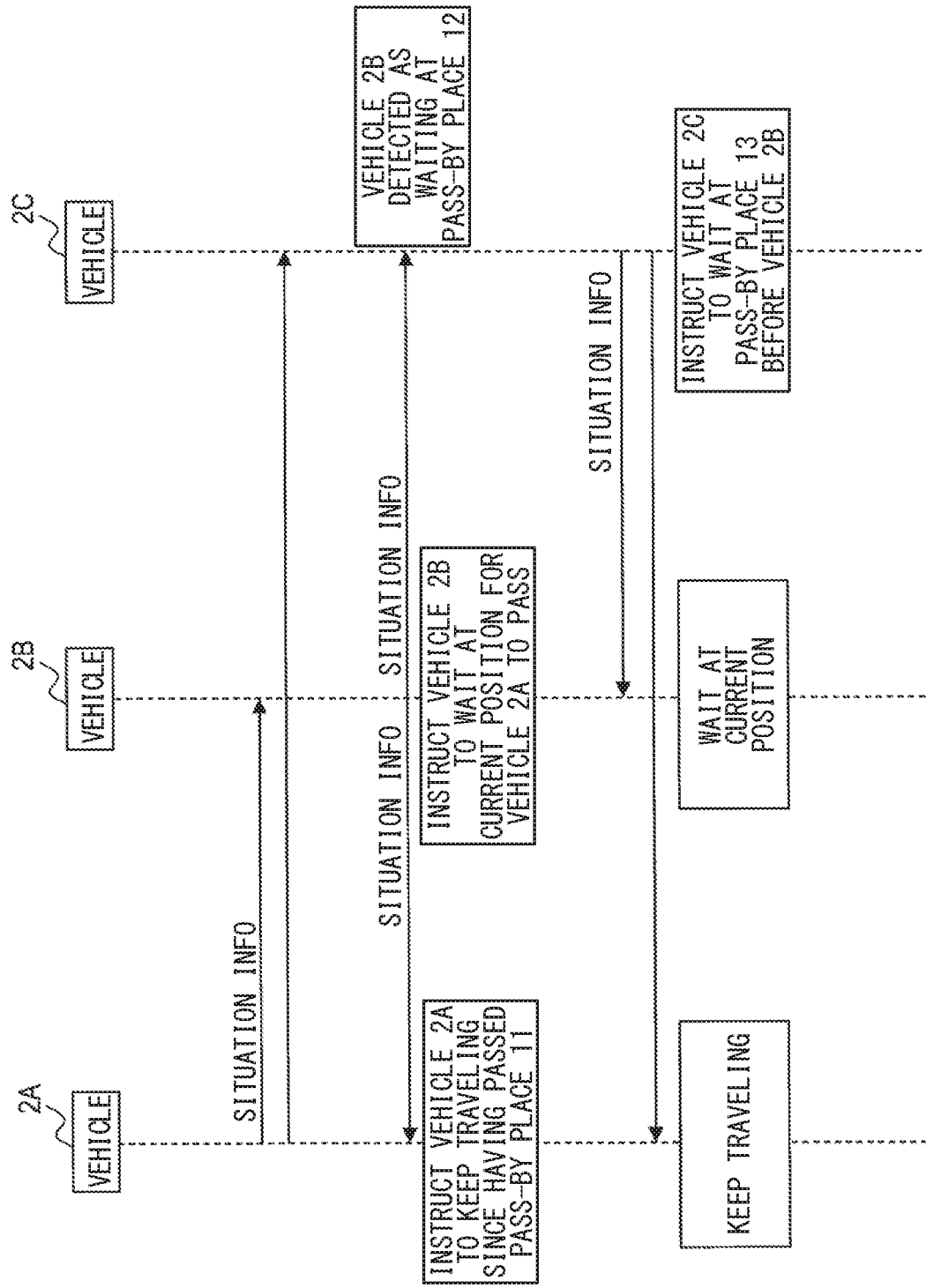
FIG. 3 is a timing chart of the drive support system according to a second embodiment in the present disclosure.

In addition, the calculation of a passing method with the on-coming vehicle in the station 3 and the processing of the wait instruction or the notification instruction can also be performed in the vehicles 2A to 20, respectively. In such a case, as shown in FIG. 3, the vehicles 2A to 20 mutually receive (i.e., exchange) the situation information and the vehicle information by vehicle to vehicle communication. The vehicles 2A to 2C respectively calculate how to pass by the on-coming vehicle based on the situation information and the vehicle information, and respectively give the driver a notification based on the wait instruction or the notification instruction. The movements of the vehicles 2A to 2C based on the instruction is similar to the above.

2. First Embodiment

[2-1. Configuration]

Figure 4:
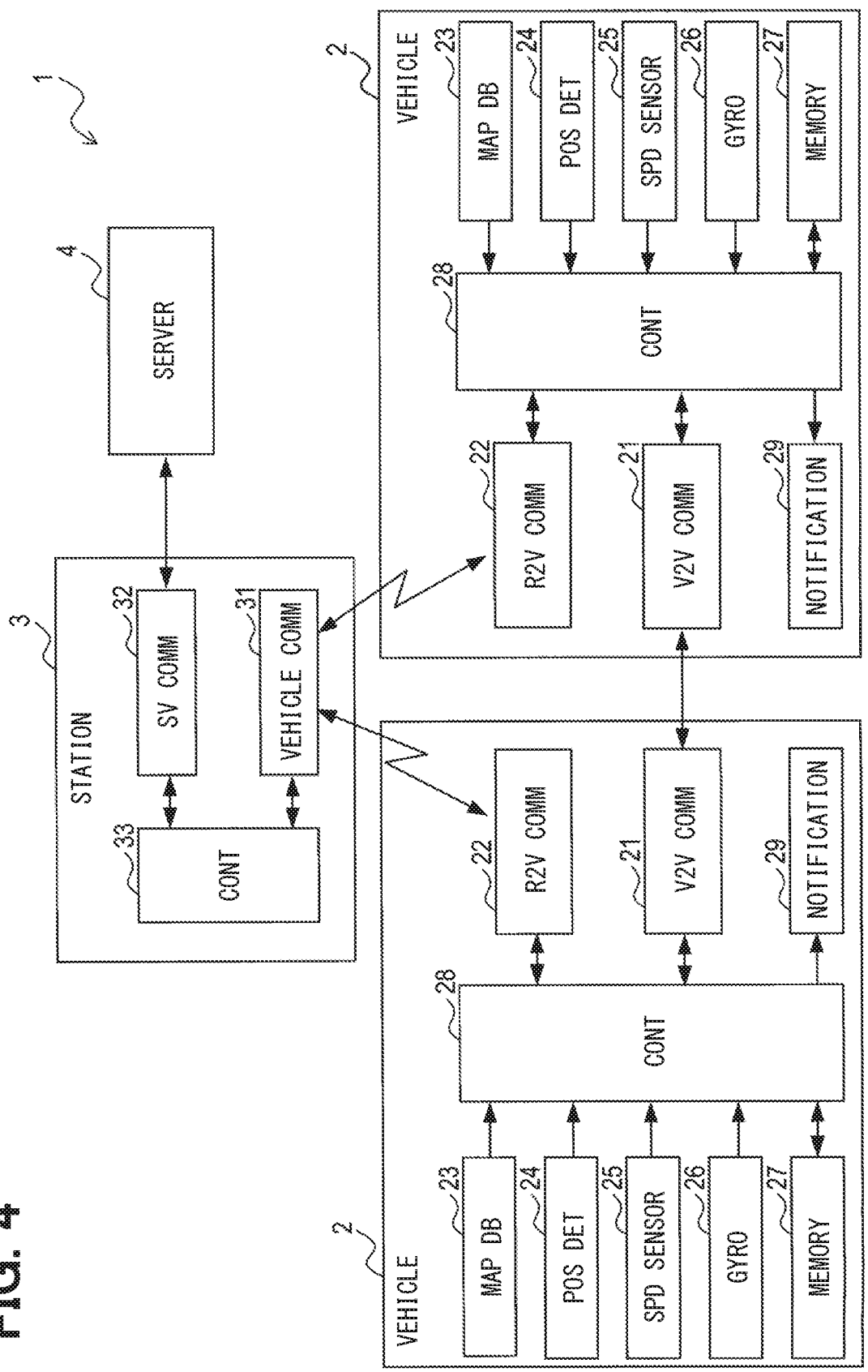
FIG. 4 is a block diagram of a configuration of the drive support system.

In the first embodiment in which the station 3 calculates the passing method with the on-coming vehicle and processes the wait instruction or the notification instruction, the drive support system 1 is provided with a plurality of the vehicles 2, the station 3 and a server 4 as shown in FIG. 4.

The vehicle 2 includes an inter-vehicle (V2V) communication device 21, a road-to-vehicle (R2V) communication device 22, a map database 23, a position detection device 24, a vehicle speed sensor 25, a gyro sensor 26, a memory 27, a control device 28, and a notification device 29.

The inter-vehicle communication device 21 is a communication device for performing wireless communication with another vehicle 2 other than the subject vehicle. Through inter-vehicle communication, each vehicle 2 transmits situation information and the vehicle information to the other vehicles, and receives the situation information and the vehicle information of the other vehicles.

The road-to-vehicle communication device 22 is a communication device for performing wireless communication with the station 3. The map database 23 stores map data. The position detection device 24 detects the current position of the subject vehicle, specifically, an absolute position represented by latitude and longitude, based on a GPS signal or the like received via a GPS antenna (not shown).

The vehicle speed sensor 25 is a sensor that detects a travel speed of the subject vehicle. The gyro sensor 26 is a sensor that detects a travel direction of the subject vehicle, and outputs a detection signal according to an angular velocity of a rotational motion applied to the subject vehicle.

The memory 27 is a storage medium that stores various information. In the present embodiment, the vehicle information is stored in advance in the memory 27. The control device 28 is implemented as, for example, a known microcomputer having a CPU, a ROM, a RAM and the like (respectively not shown). The CPU executes a program stored in the ROM, which is a non-transitory, tangible recording medium. By executing the program, a method corresponding to the program is performed. The control device 28 may include one microcomputer or may include a plurality of microcomputers. Further, the method for realizing functions of the control device 28 is not limited to implementation by software, and some or all of the functions may be realized using one or more hardware devices. For example, when a function of the control device 28 is realized by an electronic circuit, which is a hardware device, such an electronic circuit may be provided as a digital circuit, or an analog circuit, or a combination thereof, i.e., a digital-analog hybrid circuit.

The control device 28 transmits the situation information detected by the position detection device 24, the vehicle speed sensor 25, and the gyro sensor 26 and the vehicle information obtained from the memory 27 to the station 3 via the road-vehicle communication device 22.

Further, the control device 28 notifies the driver of an instruction of a drive operation to be performed, etc. based on the wait instruction or the notification instruction received from the station 3 via the road-vehicle communication device 22. The notification device 29 notifies the driver by display or sound in response to the instruction received from the control device 28.

The station 3 includes a vehicle communication unit 31, a server communication unit 32, and a control unit 33.

The vehicle communication unit 31 is a communication device for performing wireless communication with the vehicle 2. The server communication unit 32 is a communication device for performing wired communication with the server 4. The control unit 33 is implemented as, for example, a known microcomputer having a CPU, a ROM, a RAM and the like (respectively not shown). The CPU executes a program stored in the ROM, which is a non-transitory, tangible recording medium. By executing the program, a method corresponding to the program is performed. Note that the control unit 33 may include one microcomputer or a plurality of microcomputers. Further, the method for realizing the function of the control unit 33 is not limited to implementation by software, and some or all of the functions may be realized using one or more hardware devices. For example, when a function of the control device 28 is realized by an electronic circuit, which is a hardware device, such an electronic circuit may be provided as a digital circuit, or an analog circuit, or a combination thereof, i.e., a digital-analog hybrid circuit.

The control unit 33 obtains map data from the server 4 via the server communication unit 32. The map data includes information such as the width of the road, the position of the hard-to-pass-by road section, the position of the pass-by place, and the number of vehicles that can wait in the pass-by place and the like. Further, the control unit 33 executes a wait instruction transmission process shown in FIG. 5 described later, in accordance with the above-described program.

[2-2. Process]

The wait instruction transmission process performed by the control unit 33 of the station 3 is described with reference to the flowchart of FIG. 5.

First, in S101, the control unit 33 receives the situation information and the vehicle information from each of the vehicles 2 in the communication area of the station 3. The subsequent steps are individually advanced for each of the vehicles 2 in response to the relevant information transmitted therefrom.

In S102, based on the situation information received in S101 and the map data obtained from the server 4, the control unit 33 predicts whether an information source vehicle 2 i.e., a transmitter of the relevant situation information, encounters with an on-coming vehicle in a hard-to-pass-by road section.

Figure 5:
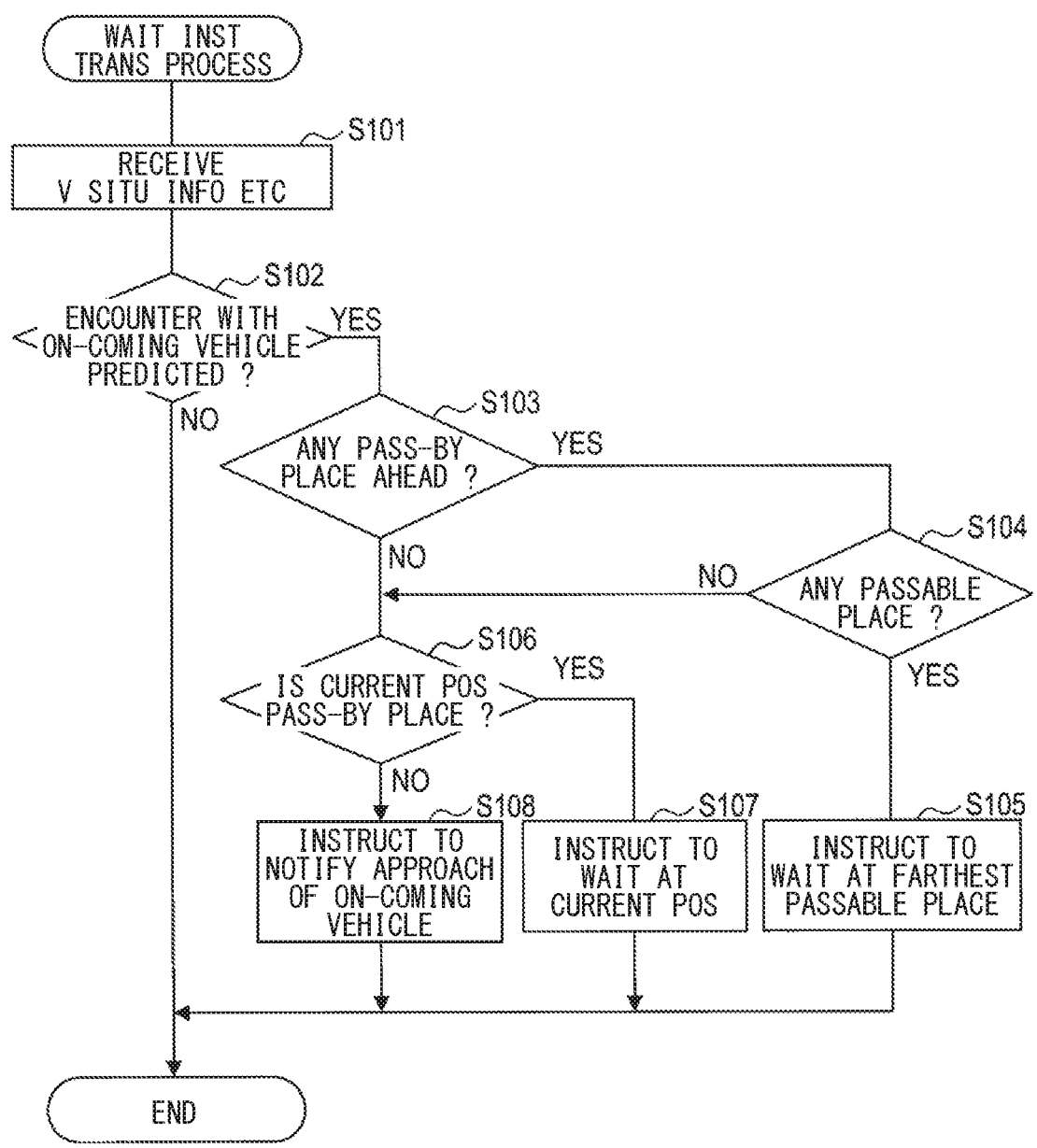
FIG. 5 is a flowchart of a wait instruction transmission process performed in a station.

If the control unit 33 predicts in S102 that the information source vehicle 2 transmitting the information does not encounter with an on-coming vehicle in the hard-to-pass-by road section, the control unit 33 ends the wait instruction transmission process of FIG. 5. On the other hand, when the control unit 33 predicts that the information source vehicle 2 transmitting the information encounters with an on-coming vehicle in the hard-to-pass-by road section in S102, the vehicle 2 is then treated as an encounter predicted vehicle which is a vehicle predicted to encounter with an on-coming vehicle in the hard-to-pass-by road section, and the process proceeds to S103.

In S103, the control unit 33 determines whether there is a pass-by place which is located on the road ahead of the encounter predicted vehicle 2, before an encounter point (i.e., an encounter predicted position) where the vehicle 2 is predicted to encounter with the on-coming vehicle. Specifically, the control unit 33 detects a pass-by place based on the situation information and the vehicle information of both of the encounter predicted vehicle 2 and the on-coming vehicle and based on the map data obtained from the server 4.

If the control unit 33 determines in S103 that there is a pass-by place, the process proceeds to S104. In S104, the control unit 33 determines whether, from among the detected pass-by place(s), there is a passable place which (i) is a pass-by place located on the road (a) ahead of the encounter predicted vehicle 2 and (b) before the encounter point, and (ii) is available to the vehicle 2 for passing by the on-coming vehicle. Specifically, the control unit 33 detects, based on the situation information of a vehicle 2 near the encounter predicted vehicle 2 and the map data obtained from the server 4, the vehicle 2 which uses (i.e., is currently using or going to use) the pass-by place detected in S103. That is, in other words, the vehicles 2 using the pass-by place may be a vehicle currently waiting in the pass-by place (i.e., an in-waiting vehicle), or may be a vehicle possibly waiting in the pass-by place in a future (i.e., a possibly waiting vehicle). More practically, the control unit 33 detects a vehicle 2 currently located in a pass-by place as an in-waiting vehicle 2 in the pass-by place base on the position information of a vehicle 2 located at a proximity of the encounter predicted vehicle 2 and the position information of the relevant pass-by place in the map data. In addition, based on the above-described position information, the control unit 33 detects a vehicle 2, which is (i) a lead vehicle of the encounter predicted vehicle 2, and is (ii) located at a position before the relevant pass-by place, as a possibly waiting vehicle 2 in the relevant pass-by place.

When there is no vehicle 2 that uses the pass-by place, the control unit 33 determines that the pass-by place is in an available state, which means that the relevant pass-by place is available to the encounter predicted vehicle 2. In addition, when there is a vehicle 2 that uses the relevant pass-by place, the control unit 33 determines whether the relevant pass-by place is in an available state (i.e., is available) to the encounter predicted vehicle 2, based on the number of vehicles that can wait in the relevant pass-by place (i.e., capacity of the pass-by place) and the number of vehicles actually and possibly using the pass-by place.

If the control unit 33 determines in S104 that there is a passable place, the control unit 33 shifts the process to S105. In S105, the control unit 33 transmits, to the encounter predicted vehicle 2, a wait instruction instructing to wait in the farthest ahead passable place, that is, at the farther-most passable place farthest from the current position, and thereafter ends the wait instruction transmission process of FIG. 5.

On the other hand, when the control unit 33 determines in S104 that there is no passable place, the process proceeds to S106. When the control unit 33 determines in S103 that there is no misplaced place, the process also proceeds to S106.

In S106, the control unit 33 determines whether the encounter predicted vehicle 2 is currently in the pass-by place, that is, whether the current position of the vehicle 2 is a pass-by place. If the control unit 33 determines in S106 that the current position is a pass-by place, the process proceeds to S107. In S107, the control unit 33 transmits a wait instruction to instruct the vehicle 2 which is an encounter predicted vehicle to wait in the current place until the on-coming vehicle passes by, and then ends the wait instruction transmission process of FIG. 5.

On the other hand, when the control unit 33 determines in S106 that the current position is not a pass-by place, the process proceeds to S108. In S108, the control unit 33 transmits to the encounter predicted vehicle 2 a notification instruction instructing to notify an approach of an on-coming vehicle, with no passable place available to the encounter predicted vehicle 2, and then ends the wait instruction transmission process of FIG. 5.

[2-3. Effects]

According to the first embodiment described above, the following effects are achievable.

(2*a*) In the present embodiment, the station 3 receives the situation information from each of the vehicles 2 in the communication area, and based on the received situation information, for each of the information source vehicles 2 that has transmitted the information, the station 3 predicts whether the vehicle 2 encounters with an on-coming vehicles in a hard-to-pass-by road section. For the encounter predicted vehicle 2, the station 3 detects a pass-by place which is located on the road ahead and is located before an encounter point where an encounter with the on-coming vehicle is predicted, and based on a use situation of the pass-by place by the other vehicle, the station 3 determines whether or not the pass-by place is available. Based on the result of determination described above, the station 3 transmits a wait instruction instructing the encounter predicted vehicle 2 to wait in a passable place. Thus, in consideration of the other vehicle other than the on-coming vehicle, it becomes possible to notify the driver of the pass-by place available to the subject vehicle.

(2*b*) In the present embodiment, the station 3 transmits, to the encounter predicted vehicle 2, a wait instruction instructing to wait in the farthest ahead passable place. In such manner, the driver can drive to go as far forward as possible and then wait. Further, according to the wait instruction, when there are a plurality of passable places available to the subject vehicle, the driver is instructed (i.e., is advised) to perform a drive operation, for using a closest one of the passable places to the on-coming vehicle. Therefore, compared with a case where the driver performs a drive operation to use the closest to the current position, the passable places not used by the subject vehicle are made available to the follower vehicle(s), which makes the situation involving many vehicles 2 to be more efficient in terms of how to use the pass-by places.

(2*c*) In the present embodiment, the station 3 determines whether the encounter predicted vehicle 2 is currently in a pass-by place when there is no passable place, and when it is determined that the vehicle 2 is currently in a pass-by place, the station 3 transmits a wait instruction instructing to wait in the current pass-by place until the on-coming vehicle passes by to the encounter predicted vehicle 2. In such manner, the driver of the encounter predicted vehicle 2 is prevented from leaving the current pass-by place, without knowing that there is no passable place ahead on the road.

(2*d*) In the present embodiment, when the station 3 determines that there is no passable place and the encounter predicted vehicle 2 is not currently in the pass-by place, the station 3 transmits a notification instruction that instructs to notify the driver of an approach of an on-coming vehicle. In such manner, it is possible to notify the driver of the presence of the on-coming vehicle in advance and to alert the driver, and also possible to prevent the driver from needlessly searching for a pass-by place, thereby directing the driver's attention to concentrate on the on-coming vehicle.

(2*e*) In the present embodiment, the station 3 obtains from the server 4 the map data used for predicting encounters with the on-coming vehicles and for detecting the passable places. Therefore, compared with the case where the map data used for detecting encounter with the on-coming vehicles and for detecting the passable places is stored in the map database 23 of each vehicle, it is easy to perform an update of the map data.

In the first embodiment, S101 corresponds to processing as a situation information obtaining unit, S102 corresponds to processing as an encounter prediction unit, and S104 to S108 correspond to processing as an instructor.

3. Second Embodiment

[3-1. Configuration]

The basic configuration of the drive support system 1 of the second embodiment is the same as that of the drive support system 1 of the first embodiment shown in FIG. 4. Thus, the same reference numerals are used for the configurations common to the first embodiment, for not repeating the description of the same configurations, and the configurations different from the first embodiment are mainly described.

The drive support system 1 in the second embodiment performs a prediction of encounter with an on-coming vehicle, a detection of passable places, and processing of a wait instruction or a notification instruction, which are performed by the control unit 33 of the station 3 in the first embodiment, by the control device 28 of each vehicle 2.

In the second embodiment, the control device 28 performs, instead of performing the processing of transmitting the situation information and the vehicle information to the station 3 in the first embodiment, a calculation of how to pass by the on-coming vehicle based on the situation information and the vehicle information of the other vehicle 2 received by the vehicle to vehicle communication and based on the situation information and the vehicle information of the subject vehicle, and instructs the notification device 29 to provide a notification to the driver according to the wait instruction or the notification instruction. The map data stored in the map database 23 includes information such as the width of the road, the position of the hard-to-pass-by road section, the position of the pass-by place, and the number of vehicles that can wait in the pass-by place.

[3-2. Process]

A pass-by place notification process performed by the control device 28 of the vehicle 2 is described with reference to a flowchart of FIG. 6.

First, in S201, the control device 28 obtains the situation information of the subject vehicle from the position detection device 24, the vehicle speed sensor 25 and the gyro sensor 26, and obtains the vehicle information of the subject vehicle from the memory 27.

In S202, the control device 28 receives the situation information and the vehicle information from each of the other vehicles 2 at a communicable distance at which the vehicle to vehicle communication is performable. In S203, the control device 28 predicts whether or not the subject vehicle encounters with the on-coming vehicle in the hard-to-pass-by road section based on the situation information of the subject vehicle obtained in S201, the situation information received from the other vehicle 2 and the map data obtained from the map database 23 in S202.

Figure 6:
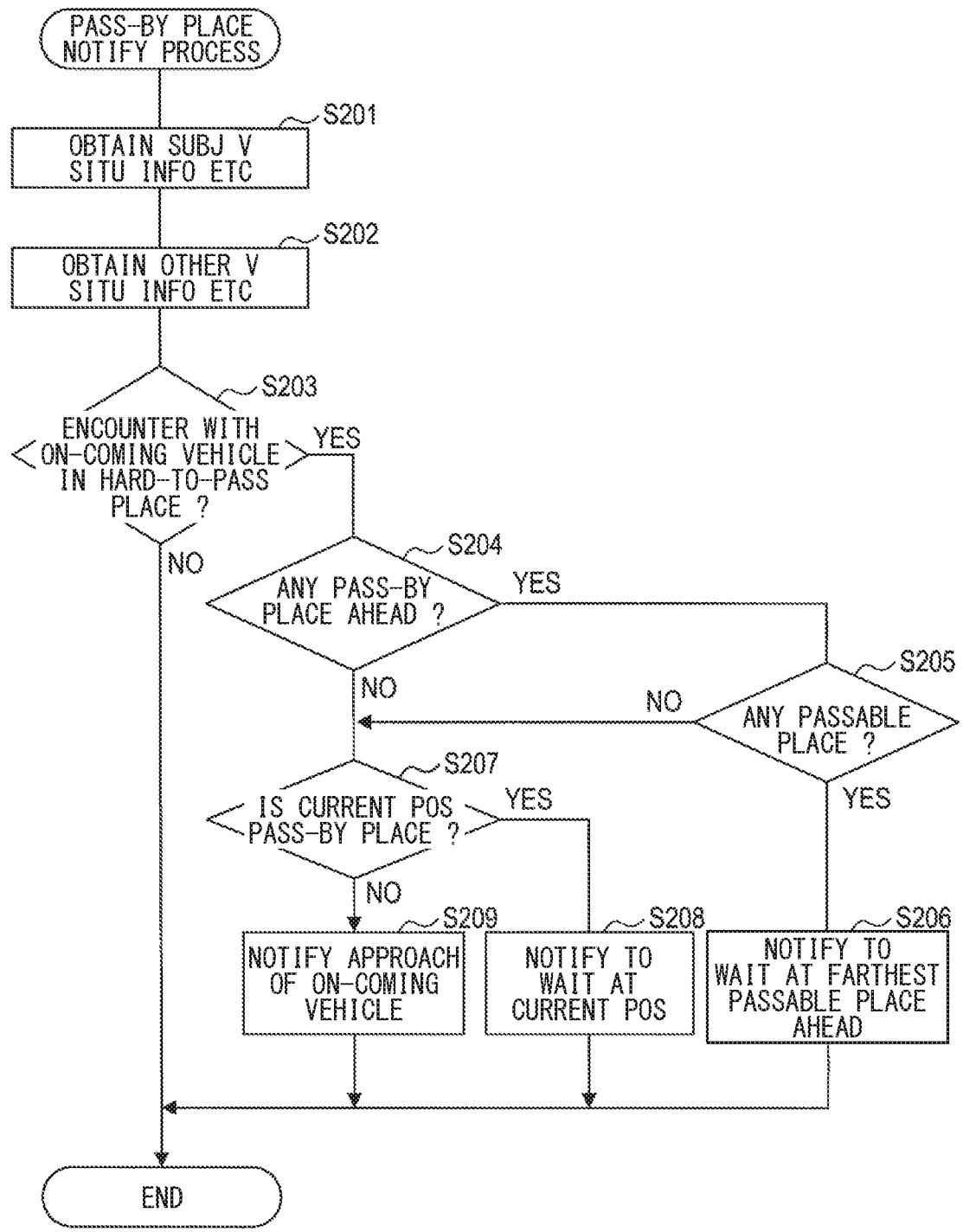
FIG. 6 is a flowchart of a pass-by place notification process performed in a vehicle.

When it is predicted that no encounter with the on-coming vehicle is expected in the hard-to-pass-by road section in S203, the control device 28 ends the pass-by place notification process of FIG. 6. On the other hand, when it is predicted that the subject vehicle encounters with the on-coming vehicle in the hard-to-pass-by road section in S203, the control device 28 shifts the process to S204.

In S204, the control device 28 determines whether there is a pass-by place which is located on the road ahead and is located before an encounter point where an encounter with the on-coming vehicle is predicted. Specifically, the control device 28 detects the pass-by place based on the situation information and the vehicle information of the subject vehicle and the on-coming vehicle, and the map data obtained from the map database 23.

If it is determined in S204 that there is a pass-by place, the control device 28 shifts the process to S205. In S205, the control device 28 determines whether there is a passable place. Specifically, the control device 28 detects a vehicle 2 using the pass-by place detected in S204 based on the situation information of the vehicle 2 near (i.e., located close to) the subject vehicle and the map data obtained from the map database 23. The control device 28 detects a vehicle 2 currently in a pass-by place as an in-waiting vehicle 2 in the pass-by place based on the position information of the vehicle 2 near the subject vehicle and the position information of the relevant pass-by place included in the map data. Further, based on the position information described above, the control device 28 detects a vehicle 2 that is a lead vehicle of the subject vehicle and is located at a position before the relevant pass-by place as a possibly waiting vehicle 2 in such pass-by place.

When there is no vehicle 2 using the pass-by place, the control device 28 determines that the pass-by place is in an available state, i.e., is available to subject vehicle. When there is a vehicle 2 using the pass-by place, the control device 28 determines, based on the number of vehicles that can wait in the pass-by place included in the map data and the number of vehicles 2 that actually use the pass-by place, whether or not the pass-by-pace is available to the subject vehicle.

If it is determined in S205 that there is a passable place, the control device 28 shifts the process to S206. In S206, the control device 28 notifies the driver to wait in the farthest ahead passable place, i.e., a passable place farthest from the current position, and then ends the pass-by place notification process of FIG. 6.

On the other hand, when it is determined in S205 that there is no passable place, the control device 28 shifts the process to S207. Also, if it is determined in S204 that there is no pass-by place, the control device 28 shifts the process to S207.

In S207, the control device 28 determines whether the subject vehicle is currently in a pass-by place, that is, whether the current position of the subject vehicle is a pass-by place. If the control device 28 determines in S207 that the current position is a pass-by place, the process proceeds to S208. In S208, the control device 28 notifies the driver to wait at the current position until the on-coming vehicle passes, and then ends the pass-by place notification process of FIG. 6.

On the other hand, when the control device 28 determines in S207 that the current position is not a pass-by place, the process proceeds to S209. In S209, the control device 28 notifies the driver that there is no passable place together with an approach of an on-coming vehicle, and then ends the pass-by place notification process of FIG. 6.

[3-3. Effects]

According to the second embodiment described above, in addition to the same effects as (2a) to (2d) of the above-described first embodiment, the following effects are also achievable.

(3a) In the present embodiment, in each vehicle 2, a prediction of encounter with an on-coming vehicle, a detection of a passable place, and a notification to the driver based on a wait instruction or a notification instruction are performed. Thereby, for example, even when the subject vehicle cannot communicate with the station 3, i.e., when the subject vehicle is not within a communication area of the station 3 and is predicted to encounter with an on-coming vehicle, for example, a notification to the driver regarding such a situation is performable.

Note that, in the second embodiment, S201 corresponds to processing as a subject vehicle information obtaining unit, S202 corresponds to processing as an other vehicle information obtaining unit, S203 corresponds to processing as an encounter prediction unit, and S205 to S209 corresponds to processing as a notifier.

4. Other Embodiments

Although embodiments of the present disclosure are described above, it cannot be overemphasized that the present disclosure can take various forms, without being limited to the above-mentioned embodiments.

(4a) In the first embodiment, the station 3 obtains, from the server 4, the map data used for a prediction of encounter with an on-coming vehicle and for a detection of a passable place. However, for example, the station 3 may be provided with a map database storing the map data, and may be configured to obtain the map data from such a map database.

(4b) In the first embodiment, when the vehicle 2 receives a wait instruction or a notification instruction from the station 3, the vehicle 2 performs a notification to the driver based on the instruction. However, for example, the vehicle 2 (i.e., instead of the station 3) may be configured to make a final determination as to whether or not to perform such a notification to the driver based on the wait instruction or the notification instruction received from the station 3.

(4c) In the second embodiment, the vehicle 2 obtains, from the map database 23, the map data used for a prediction of encounter with an on-coming vehicle and for a detection of a passable place. However, for example, the vehicle 2 may be configured to obtain the map data from the server 4 for such purposes.

(4d) In each of the above embodiments, the map data is used to predict encounters with the on-coming vehicles and to detect passable places where the subject vehicle can pass by the oncoming vehicle. However, instead of using the map data, it is also possible to use minimal information for the same purposes, such as coordinate information. In such case, for example, it is possible to specify a hard-to-pass-by road section as an area defined by the coordinates of four points, and it is possible to determine whether or not the current position of the vehicle 2 is in a hard-to-pass-by road section by determining whether the coordinates of a current position of the vehicle 2 is within such an area defined by the four points.

(4e) In each of the above embodiments, when predicting whether to encounter with an on-coming vehicle in a hard-to-pass-by road section, the size of the subject vehicle and the size of the on-coming vehicle may be used. In such case, for example, based on two classes (e.g., large and small) of the vehicle size (e.g., Large truck, Small passenger vehicle), it may be determined whether the vehicles are passable with each other in a hard-to-pass-by road section. That is, when both of the two vehicles are categorized in a small class described above, it may be determined that the two vehicles are passable, and, when at least one of the two vehicles is categorized in a large class, it may be determined that the two vehicles are not passable, based on a relationship between the road width of a relevant road section and a combination of the vehicle sizes (i.e., classes). Then, if it is determined that the two vehicles are hard to pass by with each other in the relevant road section based on the combination of the vehicle sizes, it may be predicted that the subject vehicle encounters with the on-coming vehicle in the hard-to-pass-by road section.

(4f) In each of the above embodiments, the availability of the pass-by place to the subject vehicle is determined based on (i) the capacity of the pass-by place (i.e., how many vehicles can wait in the pass-by place) specified in the map data and (ii) the number of the vehicles actually using the pass-by place. However, for example, based on the vehicle size of the vehicle 2 using the pass-by place and the vehicle size of the subject vehicle, the availability of the pass-by place may be determined.

(4g) In each of the above embodiments, when there is no passable place and the current position is not a pass-by passable place, the driver of the subject vehicle is notified that there is no passable place but an on-coming vehicle is approaching. However, in such case, nothing may be notified to the driver of the subject vehicle.

(4h) The function of one component in the above-described embodiment may be distributed to be borne by using a plurality of components, or the function of a plurality of components may be integrated to be borne one component. Further, a part of the above-described configurations in the embodiments may be omitted. In addition, at least a part of the configuration of the above-described embodiment may be added to or replaced with the configuration of the other one of the above-described embodiments.

(4i) In addition to the station 3 or the control device 28 described above, the present disclosure may be embodied in various forms, such as a system having the station 3 or the control device 28 as its component, as a program that controls a computer to serve as the control unit 33 or the control device 28 of the station 3, as a storage medium of storing such a program, as a drive support method or the like.

What is claimed is:

1. An in-vehicle device disposed on a subject vehicle, the in-vehicle device comprising:
    a memory,
    a control device coupled to the memory and configured to:
    (i) obtain subject vehicle situation information and subject vehicle non-situation information, wherein the subject vehicle situation information includes a subject vehicle position and a subject vehicle speed, and wherein the subject vehicle non-situation information is associated with a subject vehicle size;
    (ii) store, in the memory, the subject vehicle situation information and the subject vehicle non-situation information;
    (iii) obtain, using wireless vehicle-to-vehicle communication, target vehicle situation information and target vehicle non-situation information on a target vehicle;
    (iv) determine whether the subject vehicle will encounter the target vehicle in a hard-to-pass place; and
    (v) in response to determining that the subject vehicle will encounter the target vehicle in the hard-to-pass place, detect an other vehicle that uses a pass-by place positioned on a road ahead of the subject vehicle and before a predicted encounter position with the target vehicle based on the subject vehicle situation information,
    based on detecting the other vehicle, determine an availability of the pass-by place, and
    transmit an instruction to a notifier to notify a driver of the subject vehicle with a display or a sound.

2. The in-vehicle device of claim 1, wherein the control device is further configured to:
    upon a determination that the pass-by place is ahead, determine whether there is any passable place available;
    upon a determination that passable place is available, notify the driver of the subject vehicle to wait at a farthest ahead available passable place.

3. The in-vehicle device of claim 1, wherein the control device is further configured to:
    upon a determination that the pass-by place is ahead, determine whether there is any passable place available;
    upon a determination that a passable place is not available, determine whether a current position is a pass-by place;

upon a determination that the current position is a pass-by place, notify the driver to wait at the current position.

4. The in-vehicle device of claim 1, wherein the control device is further configured to:
   upon a determination that the pass-by place is ahead, determine whether there is any passable place available;
   upon a determination that a passable place is not available, determine whether a current position is a pass-by place;
   upon a determination that the current position is not a pass-by place, notify the driver of an on-coming vehicle.

5. The in-vehicle device of claim 1, wherein the control device is further configured to:
   upon a determination that the pass-by place is not ahead, determine whether a current position is a pass-by place;
   upon a determination that the current position is a pass-by place, notify the driver to wait at the current position.

6. The in-vehicle device of claim 1, wherein the control device is further configured to:
   upon a determination that the pass-by place is not ahead, determine whether a current position is a pass-by place;
   upon a determination that the current position is not a pass-by place, notify the driver of an on-coming vehicle.

7. The in-vehicle device of claim 1, wherein the control device is further configured to:
   cause the notifier to notify the driver that the subject vehicle is waiting at the passable place.

8. The in-vehicle device of claim 1, wherein the control device is further configured to:
   detect, as the other vehicle that uses the pass-by place, a vehicle currently waiting in the pass-by place and a vehicle that will possibly be waiting in the pass-by place in the future, and
   determine that the pass-by place is available when there is no vehicle that uses the pass-by place.

9. The in-vehicle device of claim 1, wherein the control device is further configured to determine whether the pass-by place is available based on a number of vehicles that can wait in the pass-by place and a number of vehicles actually using the pass-by place.

10. The in-vehicle device of claim 8, wherein the control device is further configured to detect, as the vehicle that will possibly be waiting in the pass-by place, a vehicle that leads the target vehicle and is located at a position before the pass-by place.

11. The in-vehicle device of claim 1, wherein the target vehicle is different from the other vehicle.

* * * * *